(12) United States Patent
Kenworthy et al.

(10) Patent No.: US 9,605,496 B2
(45) Date of Patent: Mar. 28, 2017

(54) DEVICES AND METHODS FOR CONTROLLING A MULTI-CHANNEL SYSTEM IN A PETROLEUM WELL

(71) Applicants: Michael W. Kenworthy, Chester, VT (US); Boris Ganelin, Brooklyn, NY (US)

(72) Inventors: Michael W. Kenworthy, Chester, VT (US); Boris Ganelin, Brooklyn, NY (US)

(73) Assignee: Technology Commercialization Corp., Chester, VT (US)

( * ) Notice: Subject to any disclaimer, the term of this patent is extended or adjusted under 35 U.S.C. 154(b) by 0 days.

(21) Appl. No.: 14/714,309

(22) Filed: May 17, 2015

(65) Prior Publication Data
US 2016/0265288 A1 Sep. 15, 2016

Related U.S. Application Data

(60) Provisional application No. 62/132,853, filed on Mar. 13, 2015.

(51) Int. Cl.
*E21B 17/18* (2006.01)
*F16L 55/07* (2006.01)
*E21B 34/06* (2006.01)
*E21B 43/12* (2006.01)

(52) U.S. Cl.
CPC ............. *E21B 17/18* (2013.01); *E21B 43/12* (2013.01); *F16L 55/07* (2013.01)

(58) Field of Classification Search
CPC ........... E21B 17/18; E21B 34/06; F16L 55/07
See application file for complete search history.

(56) References Cited

U.S. PATENT DOCUMENTS

| | | | | |
|---|---|---|---|---|
| 1,930,285 A | * | 10/1933 | Robinson | B64C 3/00 114/79 W |
| 5,832,956 A | * | 11/1998 | Nimberger | F16K 11/22 137/597 |
| 5,950,651 A | | 9/1999 | Kenworthy | |

(Continued)

OTHER PUBLICATIONS

Reinemiann DJ et al. Theory of small-diameter airlift pumps. Int J Multiphase Flow. vol. 16, pp. 113-122, 1990.

*Primary Examiner* — James G Sayre
(74) *Attorney, Agent, or Firm* — Boris Leschinsky

(57) ABSTRACT

The devices and methods for controlling flow through a multi-channel system deployed in a petroleum well are disclosed. The devices of the invention feature a manifold with a plurality of inlets operably connected to the passageways of the multi-channel system. Individual flows of the multi-phase petroleum fluid from the parallel passageways of the multi-channel system towards the inlets of the manifold are controlled by opening or closing of corresponding stopping valves installed on each inlet or group of inlets. After exiting the inlets through the stopping valves, the flows of the multi-phase fluid are consolidated and directed towards single or multiple outlets of the manifold and ultimately towards the outlet of the petroleum well. Individual opening or closing of the stopping valves has the effect of increasing or decreasing the total cross-sectional area available for producing fluid flow through the well.

16 Claims, 8 Drawing Sheets

(56) References Cited

U.S. PATENT DOCUMENTS

| | | | | |
|---|---|---|---|---|
| 5,979,506 | A * | 11/1999 | Aarseth | F16L 53/008 138/114 |
| 6,538,198 | B1 * | 3/2003 | Wooters | E21B 17/206 138/111 |
| 8,297,363 | B2 | 10/2012 | Kenworthy | |
| 8,459,965 | B2 | 6/2013 | Morris | |
| 8,555,978 | B2 | 10/2013 | Ganelin | |
| 8,671,992 | B2 * | 3/2014 | Feechan | B29D 23/001 138/115 |
| 2008/0000538 | A1 * | 1/2008 | Jansen | F02C 7/232 137/870 |
| 2011/0000674 | A1 * | 1/2011 | Mendez | E21B 34/06 166/316 |
| 2012/0000670 | A1 | 1/2012 | Kenworthy | |
| 2012/0038368 | A1 * | 2/2012 | Mahalingam | A61B 5/0536 324/603 |
| 2013/0146171 | A1 | 6/2013 | Quigley | |
| 2015/0068773 | A1 * | 3/2015 | McCabe | E21B 34/06 166/387 |

\* cited by examiner

US 9,605,496 B2

DEVICES AND METHODS FOR CONTROLLING A MULTI-CHANNEL SYSTEM IN A PETROLEUM WELL

CROSS-REFERENCE DATA

This patent application claims a priority benefit of the U.S. Provisional Patent Application No. 62/132,853 filed on Mar. 13, 2015 by the same inventors and entitled "Devices and methods for implementing a variable velocity string", which is incorporated herein in its entirety by reference.

INTRODUCTION

The invention relates to methods and devices used to broaden the application of a multi-channel system in petroleum wells, such as gas, coalbed methane (CBM), condensate and oil wells. The multi-channel system or "MCS" may comprise one or more lengths or segments of extruded, molded or otherwise manufactured or assembled components made from elastomeric, metallic, composite or multi-component material and having two or more side-by-side passageways (the terms passageways, tubes and channels are herein used interchangeably) for the fluid to flow through from its beginning to its end. It may also include a bundle of parallel individual tubes or dividers having two or more internal passageways running from its beginning to its end. Such passageways or tubes may each have any cross sectional shape, e.g. circular, elliptical, oval, rectangular, square, polygonal or irregular and may be of any size. Such individual tubes or groups of tubes may have the same size, e.g. diameter and or shape, or may each have a different size and or shape. Such system may be configured to divide the fluid flowing up the well into multiple flows for better removal of wellbore liquids and/or solids.

Reference is made to U.S. Pat. No. 5,950,651 entitled "METHOD AND DEVICE FOR TRANSPORTING A MULTI-PHASE FLOW" (the '651 patent) that is incorporated herein in its entirety by reference. The '651 patent explains in greater detail the physical principle whereby, compared to a flowing petroleum well using a single passageway tubing, the proportion of liquid in the multi-phase flow at the top of the well may be greater when the flow is segmented into multiple flows of smaller cross-sectional area that together have the same cross sectional area as the single passageway well tubing. All MCS cross-section designs for segmenting the flow described in the '651 patent are included in the present invention. FIG. 1 shows one design of an MCS extrusion (1) illustrating one example of such cross-sections having multiple small holes/passageways (6) such as seven seen in FIG. 1 used in an MCS design configured for use in conjunction with the '651 patent. The diameter of such circular holes or passageways may be selected based on the desired extent of interaction between the gas and liquid phases. While the liquid-to-gas ratio is higher at the end of such conduit(s) with the segmentation of the flow into more than one individual passageway compared to a traditional single passageway tube having the same cross section, the flow resistance is increased as well. For different petroleum wells with various well conditions (e.g., wellbore pressure, well depth, liquid and gas volumes produced, fluid viscosity, types of liquid produced, presence of solid particles, etc.), the optimum number of passageways and their diameter or shape will vary and may have to be optimized individually.

In embodiments, an MCS may be formed by extrusion, using any suitable elastomeric material (e.g. polymers, thermoset plastics, elastomers, rubber, co-polymer, polypropylene, vinyl, poly-vinyl chloride, etc.), including a composite utilizing additional materials (e.g. fiberglass fibers, carbon fiber, metal wire or wire rope, or fiber or metal mesh, added, mixed or embedded into the extrusion elastomeric material to increase its tensile, burst or crush strength). An MCS may also be formed using any metal material (e.g. aluminum, etc.) suitable for extrusion. Such extrusion may be wrapped or encased by material having high strength (e.g. tensile, burst or crush) to permit deployment at greater well depths or in high- or low-pressure environments. Reference is made to U.S. Pat. No. 8,671,992 B2 (the '992 patent) entitled Multi-Cell Spoolable Composite Pipe that is incorporated herein in its entirety by reference. The cross-section design of such extrusion is intended to segment the flow of production fluids moving up the well into two or more side-by-side flows, reducing the individual flow channel diameter or cross-section area. This in turn causes an increase in the interaction between the carrier phase (gas) and the carried phase (liquids and/or solids) in the multi-phase upward flow, resulting in more of the carried phase produced at the surface per unit volume of gas compared to a single passageway tubing having the same cross section available for fluid flow.

Upon initial completion, most natural gas wells typically have sufficient reservoir pressure to produce gas at the surface for a sustained period of time (often many years) without the need for any remedial lift systems to remove the buildup of liquid at the bottom of the well. Given sufficient reservoir pressure, the high flow velocity of gas from the bottom of the well on up will enable removal of produced liquids (e.g., water, oil and/or condensate) and to carry and produce these liquids (along with any small solid particles present) from the bottom of the well to the surface. Turner et al, developed and defined some predictive correlations which forecast the onset of liquid loading in producing natural gas wells. Liquid loading is defiled as liquid collecting in the bottom region of the well sufficient to create a hydrostatic head that results in back pressure on the reservoir formation that impedes or blocks the free flow of gas from the reservoir up the well. Turner introduced a term "critical velocity" which defines the minimum gas velocity necessary to remove liquid from the well. Per Turner, given sufficient gas velocity, liquid droplets and film on the tubing wall will be carried and suspended in the gas stream from the producing reservoir interval to the surface of the well. The formula for the Turner "critical velocity" was based on empirical data using commonly used 2-inch internal diameter gas production tubing, and other authors (e.g. G. B. Wallis and D. J. Reinman) have demonstrated that the "critical velocity" declines with declining tubing diameter, in particular below 20 mm in diameter. As depletion of the well progresses and reservoir pressure declines, at some point the well will fail to achieve the necessary critical gas flow velocity and liquid loading will ensue, causing a likely need for employing liquid removal technologies. Some of such wells are referred to as marginal wells or stripper wells.

Significant quantities of natural gas reserves are left behind in gas well reservoirs because production costs become prohibitively high during the final stages of the extraction process. Well operators will typically opt to plug and abandon a gas well prematurely rather than make the investments needed to prevent liquid loading during the final stages of production in efforts to further deplete the natural gas reserves. Some of the traditional liquid removal technologies include beam pumping, compression, plunger-lift, velocity strings, surfactant injection, gas lift, hydraulic pumps, casing swabs and so on. In general, the operating costs of these technologies are high because of energy requirements, additional labor and/or consumables and/or the wear and tear associated with the moving parts necessary to operate these systems.

Velocity strings (also called siphon strings) are a common workover technique for gas wells, where tubing having a diameter smaller that the diameter of the original or prior production tubing is placed inside the production tubing (or casing, if the production tubing is removed) to increase the flow velocity to or above the critical velocity needed to lift liquids to the surface of the well. For example, for a well with production tubing having a 2-inch inside diameter that is having problems with liquid loading, a velocity string may have an inside diameter of ¾-inch, 1-inch or 1¼-inch. Velocity strings help stabilize the flow rate of a flowing gas well, but other methods are often needed to kick-off the well (to initiate flow up the velocity string, or casing or tubing annulus region), and access to the bottom of the well is difficult or precluded entirely due to the small diameter of the velocity string tubing. Eventually, as the well reservoir pressure continues to decline with depletion, the velocity string will succumb to the same problem as the original production tubing, accumulating liquid in the bottom of the well that imposes a significant hydrostatic head against the gas reservoir, resulting in reduced gas production and eventual blockage.

The benefits of the '651 patent, primarily that of improving the gas-liquid flow characteristics up a gas well production tubing or riser in efforts to return the well to steady state flow production and/or reducing the gas-liquid ratio of the produced fluids, was demonstrated in an aging gas well in Kansas in 2008. The result was an increase in the energy transfer from the gas phase to the liquid phase (thereby reducing the gas-liquid ratio) and in the maintenance of a steady-state flow rate (no slugging behavior or intermittent flow). A long round extrusion 1¼ inches in diameter having seven 7-millimeter internal passageways (a so-called "multi-channel system", or MCS) was made of a polymer mixture including approximately 85% of high density polyethylene and installed in a 1,930-foot gas well. FIG. 1 represents a cross sectional view of such extrusion, having seven internal passageways (6) inside the polymer extrusion (1). Previously, gas production in the well had declined to where flow was intermittent, with a two-week slugging cycle and trending down, averaging approximately 15 thousand cubic feet (15 Mcf) of gas per day together with approximately 2½ barrels of water, and requiring soap treatments to initiate flow, despite a shut-in bottom hole pressure of 285 psi. Prior to the MCS installation, there was approximately 360 feet of accumulated water in the wellbore. After MCS installation, the well kicked off without any external energy source, requiring about three days to produce the accumulated water down to the level of the MCS entrance downhole (see the '363 patent cited below that describes in detail the liquid unloading process). The well then produced approximately 20 Mcf per day of gas together with approximately 3 barrels of water with 50-80 psig line pressure at the surface and 280 psig at the top of the casing annulus. Steady-state flow was established, with line and casing pressures staying within a 10% range for the following 6 months and more. The gas production meter differential was exceptionally smooth. Sub-zero weather had no effect on production volumes. Water salinities were in excess of 130,000 parts per million NaCl equivalent with no sign of deposits or plugging. Once installed, the system was virtually maintenance free over the next 6 years, at which point the gas production rate had reduced to approximately 17 Mcf per day. It was estimated that the steady state producing gas-liquid ratio was approximately 130 barrels of water per million cubic feet (MMcf) of gas, and based on this gas-liquid ratio calculations indicate that there was less than one foot of water (in the form of vapor and mist) in the column if condensed/concentrated. At a production rate of 20 Mcf of gas per day, it can be calculated that the gas velocity in the bottom region of the MCS (having seven 7 mm round pathways) was approximately 4.4 feet per second, and near the top was approximately 11 feet per second. Therefore the minimum gas flow velocity required to maintain steady state flow is approximately 1 foot per second (the liquid present is in a form similar to a moving cloud) flowing up the seven 7 mm passageways, so the predicted minimum flow rate of gas to maintain steady state flow can be estimated at under 5 Mcf per day.

Initially, solution gas driven oil wells produce mostly liquid, with the produced gas/liquid ratio (calculated at atmospheric pressure) increasing as depletion progresses during the "natural flowing phase", also called the "fountain stage", (pre artificial lift). Early in such natural flowing phase, annular gas-liquid flow appears near the wellhead. As depletion continues, the height along the production tubing where such annular flow regime is initiated moves progressively lower and lower down the well, production eventually becomes intermittent and eventually stops. Annular flow is characterized by high slippage of the gas phase past the liquid phase and therefore high gas/liquid ratios, and methods that can reduce this ratio have the effect of conserving the dissolved gas and pressurized gas in gas phase form (together, the energy source) in the formation, thus extending the natural flowing phase of the well. Conserving reservoir gas also maintains for a longer time the low viscosity of reservoir petroleum liquids, increasing the ultimate recovery of oil or condensate.

The natural flowing phase of an oil well is usually rather short, with only approximately 10% of the oil in the producing reservoir being recovered. Extending the natural flowing phase to achieve greater depletion before initiating artificial lift is clearly economically beneficial. Common practice in onshore wells is to initially use oil production tubing of 2 inches (inside diameter), sometimes switching to smaller-diameter tubing (e.g., 1-inch diameter) toward the end of the natural flowing phase in efforts to extend its life (Designing Coiled Tubing Velocity Strings, by Bharath Rao, 1999). In annular flow, there is correlation between the gas and liquid phase velocities vs. the diameter of the tubing or conduit, with the gas liquid ratio decreasing with declining diameter.

When an MCS is deployed in a gas, CBM, condensate or oil well, it is preferably hung from the top of the well and extends as a continuous length down to a point near or just above the region(s) where reservoir fluid enters the well. In other configurations, several MCS units having different cross section designs can be used in series along/up the well or one can be used in a limited region of the well column. While fluids can be produced or co-produced through the MCS and the annulus region to increase gas production (desirable in gas wells) or to increase liquid production in an oil well, preferably the well is produced only through the MCS string.

Reference is now made to U.S. Pat. No. 8,297,363 entitled "DEVICE AND METHOD FOR IMPROVING LIQUID REMOVAL FROM GAS, CONDENSTAE AND OIL WELLS WHEN USING A MULTI-CHANNEL SYSTEM" (the '363 patent) that is incorporated herein in its entirety by reference. The '363 patent describes an "endpiece" attached to a bottom of an MCS for purposes of providing a semi-enclosed space immediately below the MCS entrance to assist in concentrating the gas phase at the entrance of the MCS. The gas phase is the carrier phase in a multi-phase flow, whereby the pressure decline of the gas phase from MCS entrance to exit is the driving force for fluid flow. Potential energy in the form of pressure is converted into kinetic energy of the fluid along/up the MCS from its entrance to its exit, ultimately resulting in an increase in the potential energy (height) of the liquid. Therefore, increasing the concentration or volume of gas phase that enters the MCS (vs. flowing around the MCS entrance and up the well into the annulus area between the MCS and the surrounding casing or production tubing of the well) in effect increases the potential energy of the fluid entering the MCS, increasing its capacity to transport the carried phase (e.g., liquids and solid particulates). Such endpiece also provides the capability to protect the MCS entrance from being crushed when installed, to permit the MCS bottom end to be safely seated on a collar or seat nipple in the well for purposes of accurately placing the MCS bottom at the desired height/location in the well, and to screen solid particulates large enough to risk plugging the entrance to the small-diameter passageways within the MCS.

Reference is further made to U.S. Pat. No. 8,555,978 B2 entitled "DUAL PATHWAY RISER AND ITS USE FOR PRODUCTION OF PETROLEUM PRODUCTS IN MULTI-PHASE FLUID PIPELINES" (the '978 patent) that is incorporated herein in its entirety by reference. The '978 patent describes a dual pathway production tubing configuration in petroleum production well tubing, risers, jumper lines and surface pipelines whereby a) one pathway is a traditional single passageway tubing that is available for producing well fluids, as well as for providing access to downhole from the surface or to provide pigging capability from the wellbore or wellhead toward downstream in surface pipelines to a production point, and b) a second pathway is used for implementation of an MCS to improve well fluid production or transport characteristics.

The need exists therefore for an improved MSC configured to increase its efficacy in lifting liquids up a well. The various characteristics, as well as other features, will be readily apparent to those skilled in the art upon reading the following detailed description of the preferred embodiments of the invention, and by referring to the accompanying drawings. Any design feature or method described in any one embodiment of the invention may also be assumed to be applicable in any of the other embodiments described herein, and can interchangeably utilized in gas, CBM, condensate or oil wells.

SUMMARY OF THE INVENTION

Accordingly, it is an object of the present invention to provide methods and devices to be used in conjunction with an MCS to selectively operate one or more of its channels individually. To that effect, the present invention may be used to completely or partially close or open one or more of the fluid production passageways of an MCS over the life of its implementation in gas, CBM or condensate wells as the reservoir pressure and gas production rate decline with depletion—in efforts to maintain a sufficient velocity of the gas phase and ultimately to adequately lift liquid to the surface to prevent liquid loading of the well.

It is a further object of the present invention to extend the initial natural flowing phase of an oil well and to improve the efficiency of artificial gas-lift operations by providing methods and devices to be used in conjunction with an MCS to selectively operate one or more of the fluid production passageways thereof.

It is a further yet object of the present invention to provide methods to accomplish selective shutting or closing of one or more MCS fluid production pathways—such as by individually plugging one or more production pathways—by inserting a plugging object into such pathway(s), by injecting a plugging material such as glue, resin or epoxy into such pathway(s), or a combination of both.

It is yet a further object of the present invention to provide devices configured to accomplish selective control of one or more of MCS fluid production passageways—such as by employing a collar or a manifold that houses a suitable number of valves that may be controlled manually or using a motor that is controlled manually, wirelessly and/or by a controller algorithm and that can individually or in desired groups control flow in such pathway(s) so as to selectively close or open thereof, either partially or entirely.

It is another object of the present invention to provide devices suitable for operating an MCS extrusion having fluid production passageways of different diameters, whereby one or more of such production passageways have a diameter small enough to initiate kick-off of the well without the assistance of an external energy source or a prior step of removing collected liquid in the wellbore such as swabbing, and whereby one, several or all of the larger diameter MCS fluid passageways may be temporarily closed until such kick-off is achieved.

It is another yet object of the present invention to provide methods and devices configured to permit shutting or closing one or more MCS fluid production passageways in efforts to improve the effectiveness of gas re-injection or artificial gas-lift operations for gas, CBM, condensate or oil wells, such effectiveness achieved by increasing or maintaining the velocity of the gas phase in efforts to lift liquids and solids to the surface while reducing the volume of gas that must be re-injected into the production tubing.

The present invention features a manifold with a plurality of inlets operably connected to the passageways of the MCS. Individual flows of the multi-phase fluid from the passageways towards the inlets may be controlled by corresponding stopping valves installed on each inlet or group of inlets. After exiting the inlets through the stopping valves, the flows of the multi-phase fluid may be consolidated and may be directed towards a single outlet or several outlets of the manifold and ultimately towards the outlet of the petroleum well.

In embodiments, the methods of operating a petroleum well may comprise the following steps:

a) providing a manifold with a plurality of inlets in fluid communication with passageways of said multi-channel system, b) individually opening or closing the inlets so as to permit or not the multi-phase fluid to flow through the respective passageways of the multi-channel system, and c) consolidating all flow after exiting from the opened inlets towards an outlet of the petroleum well, whereby opening or closing of one or more of the inlets causing a corresponding increase or decrease of a total cross-sectional area available for producing flow through the petroleum well.

In other embodiments, the methods of operating a petroleum well may comprise the following steps:
 a) dividing a fluid flow along at least a portion of the petroleum well into a plurality of individual parallel flows using a multi-channel system comprising a plurality of individual parallel passageways, and
 b) individually opening or closing these passageways to maximize production of the petroleum well.

All of the passageways may be open at the beginning of using the well. As the well is depleted, one or more of the passageways may be periodically closed so as to maintain desirable fluid production over the entire lifetime of the well.

In further embodiments, devices and methods for operating a petroleum well may comprise dividing the flow in the well into a plurality of individual flows using a plurality of passageways of a multi-channel system, and stopping individual flows by closing off said individual passageways. Such closing off may include compressing, crushing, inserting a restrictive object, other methods and devices for reducing of cross-sectional area, or plugging with a suitable substance, such as a glue, epoxy, flowable polymer of another injectable material capable of solidifying while inside the passageway so as to stop flow therethrough.

In further yet embodiments, a petroleum well may be equipped with a MCS system comprising a plurality of smaller diameter passages and one or more of larger diameter passages. Such individual flows may be selectively permitted to flow through a manifold and then consolidated in one or more groups of flows. In one example all flows emanating from smaller diameter conduits may be consolidated in a first outlet and all flows through larger diameter conduits may be consolidated in a second outlet. After further processing (such as water or liquid removal), all flows may be consolidated together.

The present invention together with an MCS conduit has compelling economic and operating advantages over other production technologies as it enables the maintenance of steady state flow in gas wells from initial production rates of from 1 MMcf of gas per day or more all the way down to as little as 3 to 5 Mcf of gas per day without a workover, and requires no external energy source to kick-off or maintain steady state fluid flow in such gas wells.

The present invention is contemplated to increase the overall withdrawal of petroleum from an individual well. This in turn may have a desirable economic and environmental benefit of reducing the total number of wells and subsequent reduction of environmental risks associated with operating each individual well.

DETAILED DESCRIPTION OF THE INVENTION

Figure 1:
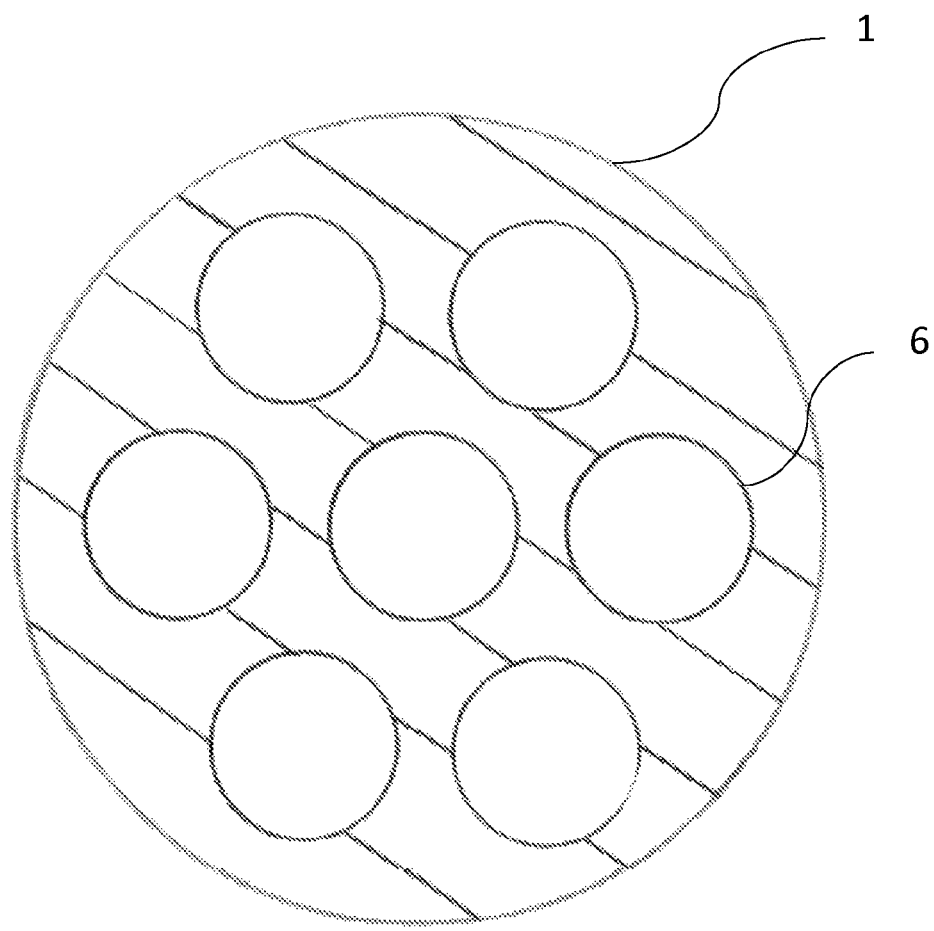
FIG. 1 shows a cross section design for an MCS extrusion as per the '651 patent cited above.

The decision of what diameter production tubing to install in a gas, CBM, condensate or oil well is inherently a compromise. In a gas well, while initially installing a relatively large diameter production tubing will increase the production rate of gas resulting in increased revenue per day, the eventual onset of liquid loading will occur earlier in the life of the well (the cumulative production of gas will be less at such point), resulting in earlier implementation of artificial lift in efforts to evacuate the liquid and higher production costs over the life of the well. Conversely, while initially installing a relatively small diameter production tubing will result in an increase in the cumulative production of gas prior to the onset of liquid loading, the production rate of gas in such initial days and months or years of production will be less, resulting in less revenue per day during such early period.

In a dissolved gas or gas cap drive oil well, initially installing a relatively large diameter production tubing will increase the production rate of oil during the initial natural flowing stage of production (also called the fountain stage), resulting in increased revenue per day. However, eventual conversion to artificial lift operations to lift the liquid to the surface will occur earlier in the life of the oil well (the cumulative production of oil will be less at such point), resulting in earlier implementation of artificial lift in efforts to evacuate the liquid, whereby increasing production costs over the life of the well. Conversely, initial installation of a relatively small diameter production tubing will result in an increase in the cumulative production of oil prior to when artificial lift operations must start, whereby reducing the production rate of oil during the initial days and months or years, whereby resulting in less revenue per day during such initial period.

The same inherent compromise is true for the implementation of an MCS in a gas, condensate or an oil well. Employing an MCS with larger-diameter internal pathways and/or more individual pathways will result in greater earlier production (and revenue) during the initial free-flowing stage of a gas well or during the initial fountain stage of an oil well. In that case, however, a conversion to artificial lift operations will also occur at an earlier point in the cumulative production of gas, condensate or oil over the life of such wells, resulting in higher production costs over the life of the well. And conversely, employing an MCS with smaller-diameter internal passageways and/or a fewer number of internal passageways in gas, condensate or oil wells will result in greater cumulative production prior to artificial lift operations to lift the liquid to the surface, but daily revenue will be less during such initial days and months or years.

The difference between the two is that the traditional single passageway production tubing is similar to being binary (either on or off), while an MCS can be viewed as more progressive (in addition to on and off, there are gradations or steps between fully open and fully closed if one or several of the passageways are shut off). The present invention is an effort to capitalize on this gradual step-wise adjustment quality of an MCS, by permitting the selective shutting off of individual internal passageways to vary the performance characteristics of the production string to match up with the varying flux potential of the well over its life.

DETAILED DESCRIPTION OF THE FIRST EMBODIMENT OF THE INVENTION

For gas wells, in efforts to maintain the minimum critical velocity requirement (maintain gas flow velocity up the production tubing sufficient to carry all liquid to the surface to keep the wellbore clear of accumulated liquid), individual internal MCS passageways may be sequentially closed as the well reservoir depletes and reservoir pressure declines in order to maintain gas flow velocity above the critical flow rate, thereby maintaining steady state flow conditions in the production tubing over a greater portion of life of the well. If different tubing diameters are utilized within the MCS, then the production rate of the gas well may be maintained at steady state flow over its entire lifespan. One example of multiple diameter passageways includes a first plurality of smaller-diameter internal passageways (such as 7 mm in diameter) as described in the '363 patent used primarily to enable kick-off of the well and removal of a liquid column therefrom, and a second plurality of internal passageways of larger diameter (such as ¾-inch in diameter) that may be used in some conventional velocity strings.

Figure 2:
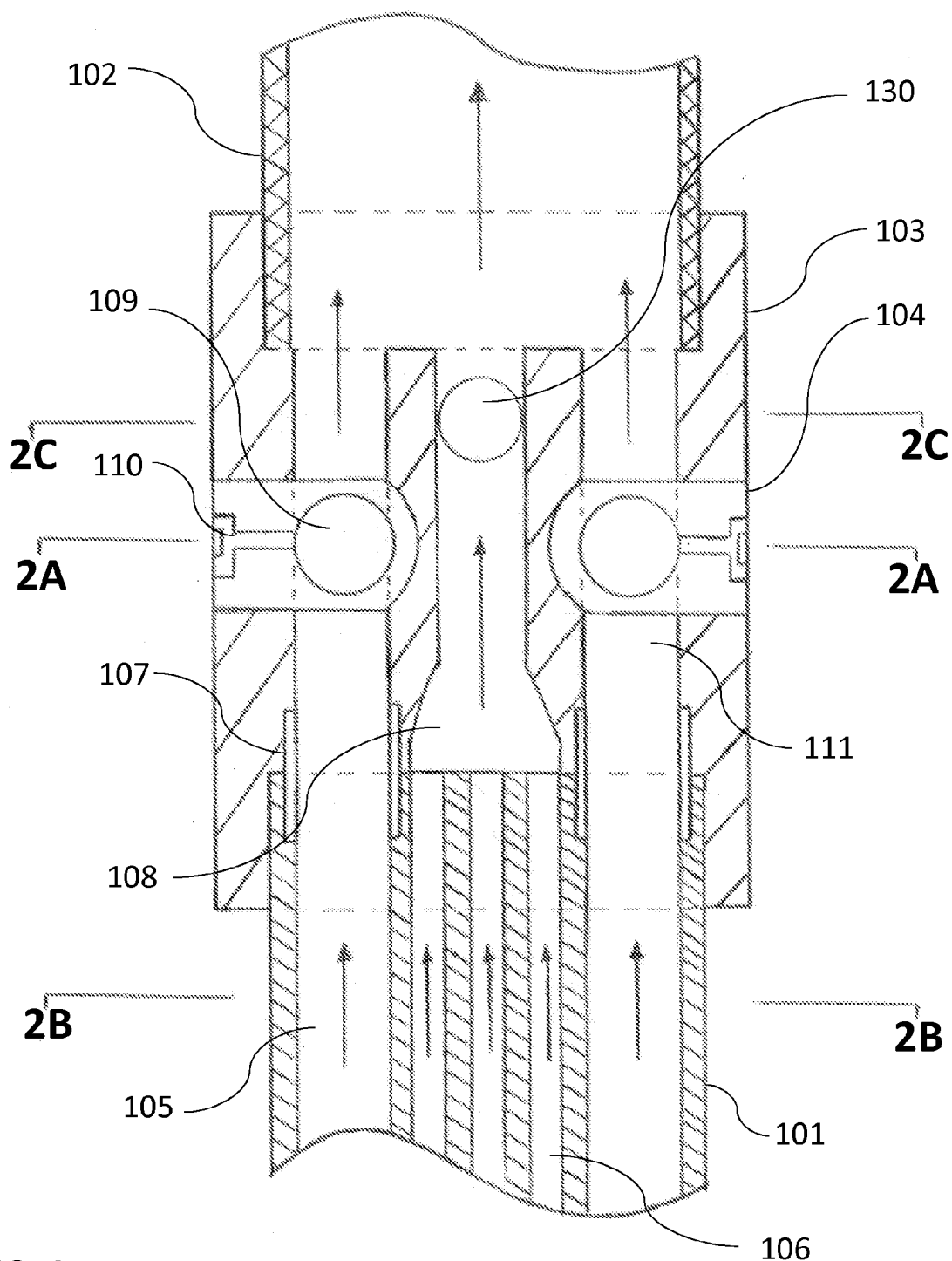
FIG. 2 shows a cross-section longitudinal view of one embodiment of the present invention together with its associated MCS conduit.
Figure 2A:
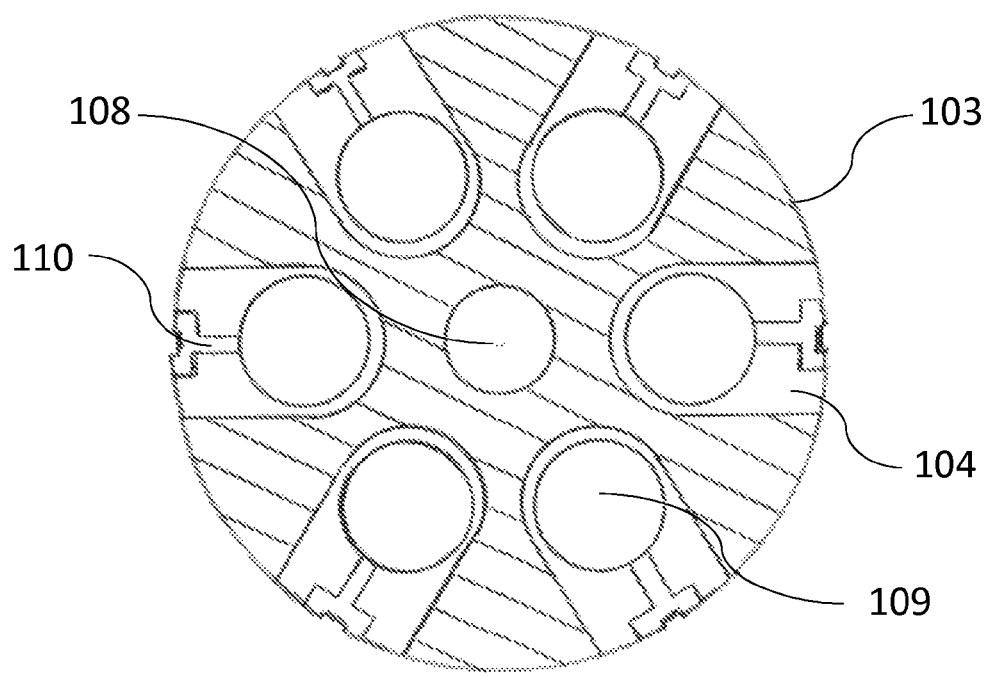
FIG. 2A shows a cross-section top view of the same.

FIGS. 2 and 2a illustrate one exemplary design of MCS using six outer internal passageways (105) having the larger diameter are ¾-inch in diameter. That makes their combined cross sectional area (4½π square inches) to be approximately the same as the cross sectional area of the commonly used 2-inch internal diameter gas well production tubing (4π square inches), thereby resulting in similar production rate/volume capacity. Adding a second set of smaller-diameter internal passageways (106) allows to expect gas production to flow at steady state down to very low production rates (i.e., 5 Mcf per day and possibly lower). Such smaller passageways may include seven 7 mm diameter internal passageways as was utilized in the Kansas test well described above. This second set of smaller-diameter production passageways may also make the MCS capable of kicking off by itself if, for example, the well is shut in for some time and liquid accumulates in the bottom of the wellbore. This may constitute an important improvement over traditionally used smaller-diameter velocity strings (e.g., ¾-inch in diameter) where kickoff is sometimes not possible by itself. In summary, when utilizing an MCS design as shown in FIG. 2 and FIG. 2a, having two sets of production passageway diameters of ¾-inch and 7 mm respectively, the gas well may be produced in a steady state manner over its entire life without compromising on (i) its maximum flow rate compared to the utilization of traditional 2-inch internal diameter production tubing or, (ii) on its minimum flow rate even when compared to using the most aggressive artificial lift techniques employed presently using traditional single-passageway production tubing.

Figure 2B:
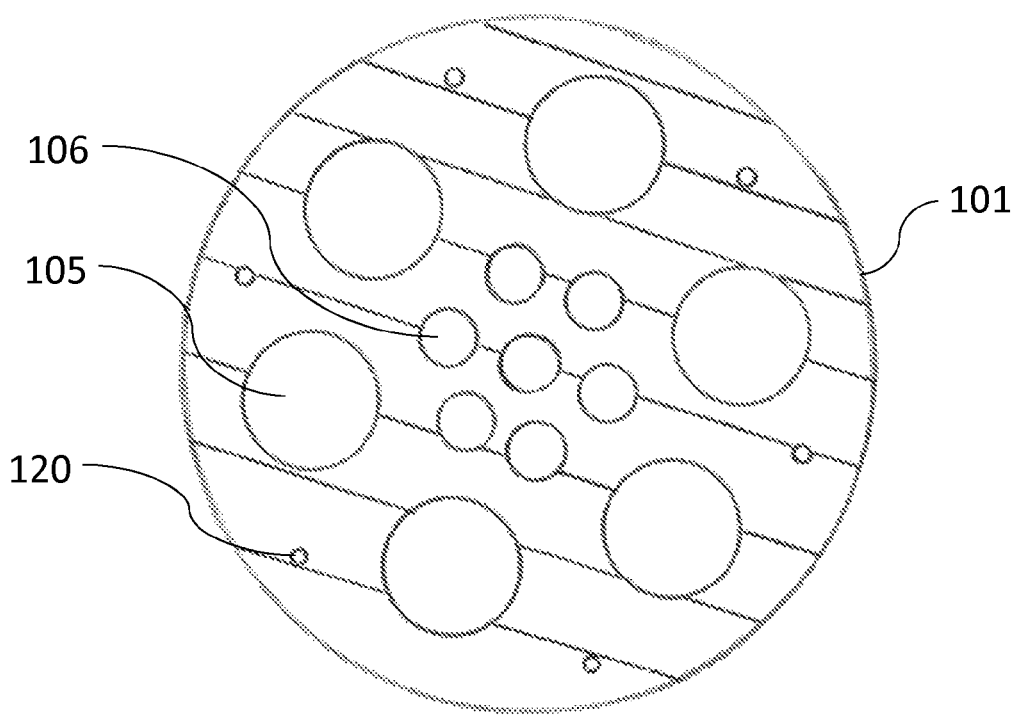
FIG. 2B shows a cross-section view of the MCS extrusion conduit design of FIG. 2
Figure 2C:
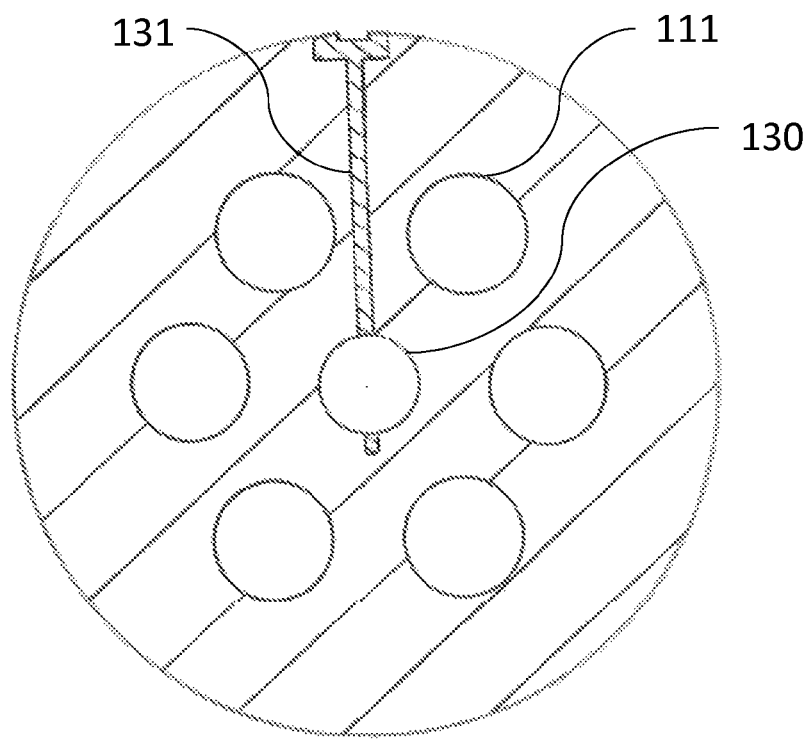
FIG. 2C shows another cross-section top view of the present invention as shown in FIG. 2.

When selectively closing the larger-diameter production passageways (105) shown in FIG. 2 and FIG. 2b, one possible concern in a higher-pressure well may be that the pressure differential between the individual passageways may have potential to cause a rupture between the passageways, leading to a catastrophic failure. If one such passageway is closed, and there is no liquid accumulation above the entrance to the MCS, the pressure at the top of such passageway will be approximately equal to the pressure at the bottom of the well. In its adjacent passageways that are open and used for producing fluid to the surface, there will be a pressure decline upwards along the passageway due to friction and increased energy dissipation associated with a multi-phase flow. If the pressure differential between the producing passageway and the adjacent non-producing passageway is excessive, then there is an increasing potential towards the top of the well for the extrusion material between the two passageways to burst or implode inbetween these passageways. To prevent this from occurring, the individual passageways (105) may be reinforced such as lined up with material that has resistance to bursting or crushing. This can be accomplished during MCS manufacturing by feeding tubes with high crush strength and/or high burst strength into the extruder when extruding the MCS. In embodiments, polymer tubing may be reinforced by embedding with braided fiber (e.g., fiberglass, metal or carbon) or by encasing a polymer tubing with a suitable sheathing (e.g., such as described in the '992 patent), or by using metallic tubes such as that described in U.S. Pat. No. 8,459,965 entitled "PRODUCTION TUBING MEMBER WITH AUXILIARY CONDUIT" (the '965 patent) that is incorporated herein in its entirety by reference.

As depicted in FIG. 2, FIG. 2a, FIG. 2b and FIG. 2c, operation of the variable velocity string manifold (103) is described as follows. All fluid flowing through small diameter passageways (106) of MCS extrusion (101) flows first into manifold (103), together entering funneling manifold passageway (108), and then flow upwards into downstream consolidating tubing (102). Optionally, flow through funneling manifold passageway (108) may be closed by an included dedicated stopping valve such as a butterfly valve (130) that may be controlled, for example, by actuator (131). All fluid flowing through outer larger-diameter passageways (105) of MCS extrusion (101) flow into manifold (103), each flowing into their own internal passageway (111) of manifold (103), and then flow upwards into downstream consolidating tubing (102). Each manifold internal passageway (111) includes a dedicated stopping valve such as a ball valve (104) having flow opening element (109) that may be configured to be opened (fully or partially) or closed, such open or closed position may be controlled for example by an actuator (110). Tubular sleeve seal elements (107) may be used to ensure that fluid flowing up each MCS extrusion larger-diameter passageway (105) enters its own dedicated manifold internal passageway (111), preventing such flow from mixing into any other manifold internal passageway (111) or bleeding into funneling manifold passageway (108). Optional embedded high tensile strength lengths of material (120) shown in FIG. 2b may increase the tensile strength of MCS extrusion (101) to enable deployment in deeper wells and if made of metal may provide an electrical pathway for delivering electric power to devices downhole or to transmit electronic signals for surface equipment to communicate with devices or sensors downhole.

In a young or relatively young gas well having a relatively high production rate (such as about 1 MMcf per day of gas or more) all MCS extrusion internal passageways (105 and 106) may be opened and allowed to flow therethrough, with all dedicated stopping valves (104) and (130) in the open position. As production ensues and reservoir pressure declines, eventually, the velocity of flow near the bottom of the outer larger-diameter passageways (105) of the MCS extrusion may decline to below the critical flow rate. That may cause the liquid to collect in the bottom of such passageways (105). Such collecting liquid will increase in volume (and in height of the well) with continued depletion, imposing backpressure on the reservoir and impeding the flow rate of gas. At some point, sufficiently large column of liquid will collect in the well causing the flow to convert from steady state flow into intermittent flow. At this point (or before, when it is noticed that liquid is collecting in the bottom of the well above the MCS extrusion entrance), one or more of the stopping valves (104) or (130) may be closed. This may reduce the effective cross section available for flow up the well. The end effect of closing at least one valve (104) may be similar to substituting a conventional 2-inch internal diameter production tubing for one that has a smaller diameter, such as a velocity string. Valve (104) closure may result in increasing the flow velocity in the remaining flowing large-diameter MCS passageways (105) and returning the flow to steady state.

Later in the life of a well, the same situation may happen again, where the gas velocity near the bottom of the large-diameter MCS passageways declines to where liquid starts to collect, and then another stopping valve (104) in the manifold (103) may be closed. This process continues iteratively until all of the stopping valves are closed, and then production will proceed only through the small-diameter passageways (106). And then, once the flow of gas becomes intermittent (i.e., having a gas flow rate of about 5 Mcf per day), the individual small diameter passageways may be individually closed off. Such closure may be accomplished for example by using a similar process of iteratively closing the ball valves (104) described above. Another alternative is to use a plugging screw or another plug—optionally together with a glue or epoxy to ensure it does not come loose. Given the low flow rate of gas at this point, removing the manifold (103) in order to gain access to plug the individual small-diameter passageways (106) may not result in much gas escaping into the atmosphere.

In further embodiments, the process of individually or sequentially closing each of the stopping valves (104) to maintain steady-state flow conditions as the well depletes and reservoir pressure declines may be automated. Small motors can be used to individually open, adjust and close the stopping valves (104) or butterfly valve (130). The replacement of actuator (110), together with casing sealing device described in FIG. 6, with wireless communication means or wires to provide electricity and signals from a control box or controller would simplify the manufacture of manifold (103) as well as its installation in the wellhead. Sensors of various types may be utilized to detect appearance of intermittent flow through the MCS, signaling the controller to shut off one or more stopping valves (104) to further restrict the cross section available for flow, leading to an increase in the velocity of the fluid to above critical flow and therefore reestablishing steady-state flow. In addition to savings in labor at the well site, computerized programs and algorithms may be developed to optimize control of the stopping valves (104) and butterfly valve (130) in order to increase fluid production in the aggregate and to minimize damage to the reservoir caused by intermittent flow conditions.

The kick-off procedure may be also automated by a controller. Initially, all larger diameter passageways may be closed and butterfly valve (130) may be open, leaving only smaller diameter passageways available for fluid flow. Once all accumulated liquid is produced to the surface, sensors of suitable types can sense steady-state flow through the MCS, signaling to the controller to sequentially open stopping valves (104) until either 1) steady-state flow is interrupted due to too many stopping valves (104) being open, and then one or more stopping valves (104) are closed to reestablish steady-state flow, or 2) a sensor estimates flow velocity and signals to the controller to adjust the number of open stopping valves (104) to result in the desired or optimal velocity in maintaining the preferred steady-state flow rate.

Alternately, instead of utilizing a manifold (103) having stopping valves (104), the large-diameter MCS passageways (105) may be individually shut using a screw or a plug, preferably with some glue or epoxy to ensure the screw or plug does not come out or become loose. In this case, the blowdown of the well to atmospheric pressure will likely result in excessive gas escaping into the atmosphere unless there is a downhole valve (not shown) located for example at the entrance to the MCS extrusion (101) that can be closed to block the flow of gas. In any case, given that the remaining large-diameter passageways (105) of the MCS extrusion may be open, the kick-off capability of the inner small-diameter passageways (106) may be significantly compromised, given the bleeding of the gas phase into the large-diameter passageways (105), where they may not be able to lift the collected liquid in the wellbore out of the well due to excessive slippage of the gas phase past the liquid in such large-diameter passageways (105).

The manifold (103) may be made of rigid molded material such as plastic used to make rigid PVC pipe, or machined from a block of solid material, such as rigid PVC or metal (e.g., steel or aluminum). The round tubing sealing sleeves (107) may be made of rigid plastic as well (e.g. rigid PVC) or metal material (e.g., steel, copper, brass or aluminum) and may be bonded or otherwise attached onto the MCS conduit and may be bonded or otherwise attached to manifold (103). The stopping valves (104) can be off-the-shelf ball valves glued or welded into the manifold (103). Ball valves may be preferred, given that they are flow-through valves, causing a minimum amount of turbulence in the flow, in efforts to reduce the pressure drop across the valve and to not cause a "tripping event" (inducing solids to come out of solution, such as scale or paraffin). For this reason, gate valves may also be utilized as stopping valves (104), but that may result in the manifold having a larger diameter, which may be less desirable. Other suitable types of valves may be used as a substitute for a stopping valve, as may be appreciated by those skilled in the art.

It is understood that all embodiments of the present invention may be utilized in all types of petroleum wells (e.g., gas, CBM, condensate and oil wells).

DETAILED DESCRIPTION OF FURTHER EMBODIMENTS OF THE PRESENT INVENTION

The same principle described above applies in using an MCS in oil wells. During the initial fountain stage in a life of an oil well, the initial fluid produced at the surface may typically be entirely liquid phase. But as production ensues, and pressure at the wellhead declines with depletion, gas in the form of liquid phase starts to come out of solution with the oil, and fluid flow produced near the surface may be in a multi-phase form (gas phase and liquid phase, together with any solids present). The gas portion of the fluid flow provides the energy to lift the liquid phase (oil and any dissolved gas). Its potential energy is released in the form of gas expansion, including both the conversion of dissolved liquid-phase gas into gas-phase gas, and in the expansion of the gas phase as the pressure declines up the well tubing. This potential energy is converted into kinetic energy of the movement of gas and liquid up the well, ultimately resulting in an increase in the potential energy (height) of the liquid phase. As more and more gas comes out of solution, its proportion increases, resulting in successive bubble flow, slug flow, churn flow and then annular flow, progressively forming from the lower portion of the production tubing towards the top. Each such flow regime is successively associated with increased slippage of the gas phase past the liquid phase. In particular, annular flow is associated with very high gas-liquid ratios. As oil production ensues during the initial fountain stage, at some point annular flow appears in the well—first at the top of the production tubing, and with declining pressure with depletion, it appears lower and lower in the production tubing.

The key benefit of implementing MCS in oil wells (as with gas wells) may be to reduce the slippage of the gas phase past the liquid phase, thereby conserving the energy source that powers the lifting of the liquid phase during the initial fountain stage of production. At higher velocities, production through an MCS may result unfavorably in a higher pressure gradient as compared with a single conduit production tubing with equivalent cross-section area given the exponential relationship of tubing diameter on pressure drop vs. velocity. However, at relatively low velocities the effect of tubing diameter on the pressure drop up the production tubing becomes less consequential. In fact, at relatively low flow velocities up small-diameter round tubing, such as less than approximately 30 feet per second in ½-inch diameter tubing, efficiency of the gas phase in lifting liquid is higher vs. that for a 2-inch diameter tubing. Reference is made to an article by D. J. Reinman, et al published in 1990 and entitled *Theory of Small-Diameter Airlift Pumps*, where experiments in air/water systems using an air lift pump demonstrated that the efficiency of the gas phase in lifting liquid increased as the tubing diameter was reduced from 20 mm to 6 mm. The article explains that in this tubing diameter range, surface tension effects start having an effect at approximately 20 mm and progressively increase as the diameter is reduced down to 6 mm in diameter. In tubes smaller than 6 mm in diameter, surface tension forces exceed buoyancy forces and the bubble is trapped (does not rise in the tubing). In such small diameter air/water systems of 6 mm-diameter and less, the slippage of the gas phase past the liquid phase is nearly eliminated.

In an oil well during the initial fountain stage, the MCS extrusion cross-section design as shown in FIG. 2b (assuming, for example, outer larger-diameter passageways of ¾-inch and the inner seven 7 mm-diameter passageways) may be employed to beneficially reduce the slippage of the gas phase past the liquid phase. At the same time, other cross-section designs may be better suited to the characteristics of oil production during the fountain stage compared to that which is best for gas wells. During the fountain stage of an oil well, the function provided by the small-diameter passageways (seven 7 mm diameter passageways) in kicking off the well may not be required, and in an oil well in the fountain stage such small diameters may be excessively restrictive. As such, the seven 7 mm-diameter passageways may preferably be replaced by a single ¾-inch passageway, for example.

Figure 3:
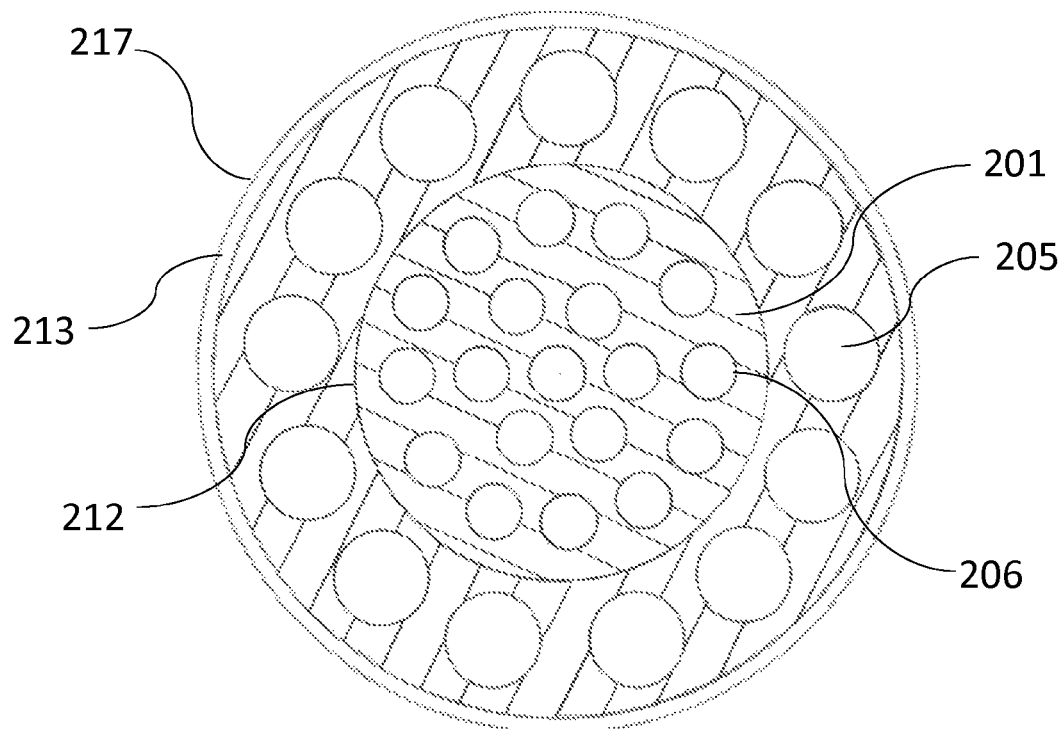
FIG. 3 shows another cross-section view of an MCS conduit design.

Alternatively, another MCS conduit cross-section design for use in oil wells during the initial natural flowing stage is shown in FIG. 3. Depicted are 19 smaller-diameter inner passageways (206), sized for example to be from about 6 mm to about 12 mm in diameter. These smaller diameter channels (nineteen channels 206 are seen in FIG. 3) may be optionally encased as a whole in a conduit (212) intended to protect against bursting or crushing relative to the larger-diameter outer passageways (205). The conduit or encasing material (212) may be made of a malleable material to improve the capability of the entire MCS conduit (217) to be spooled on a reel. Such malleable material may be, for example, aluminum, copper, plastic, wire mesh, or a suitable sheathing material. Appropriate examples of a sheathing design may include woven fibers as described in the '992 patent, as well as carbon or metallic fibers. An optional outer layer (213) may be used to provide protection against abrasion, as it may help to increase tensile strength and/or may help protect against bursting or crushing due to pressure differentials between the outer passageways (205) of MCS conduit (217) and the external environment. Such encasing outer layer (213) may be made also of a malleable material, for example, steel, aluminum, copper, plastic, or a sheathing material mentioned above.

In embodiments, instead of employing one stopping valve (104) for each one of the outer passageways (105), the flow through several (e.g., two, three or four) outer passageways (105) may be first consolidated and then directed towards a single stopping valve (104). Flow consolidation from a group of outer passageways may be accomplished in the lower end of the MCS manifold (103) and then directed towards a single flow conduit (not shown) prior to entering the middle section of the MCS manifold (103) where the dedicated stopping valve (104) may be located to control flow therethrough. In such case, reinforcement partition elements (416) seen in FIG. 5 may be optionally positioned between neighboring groups of outer passageways (405) in efforts to prevent bursting or crushing the outer ring extrusion (414) therebetween.

Figure 4:
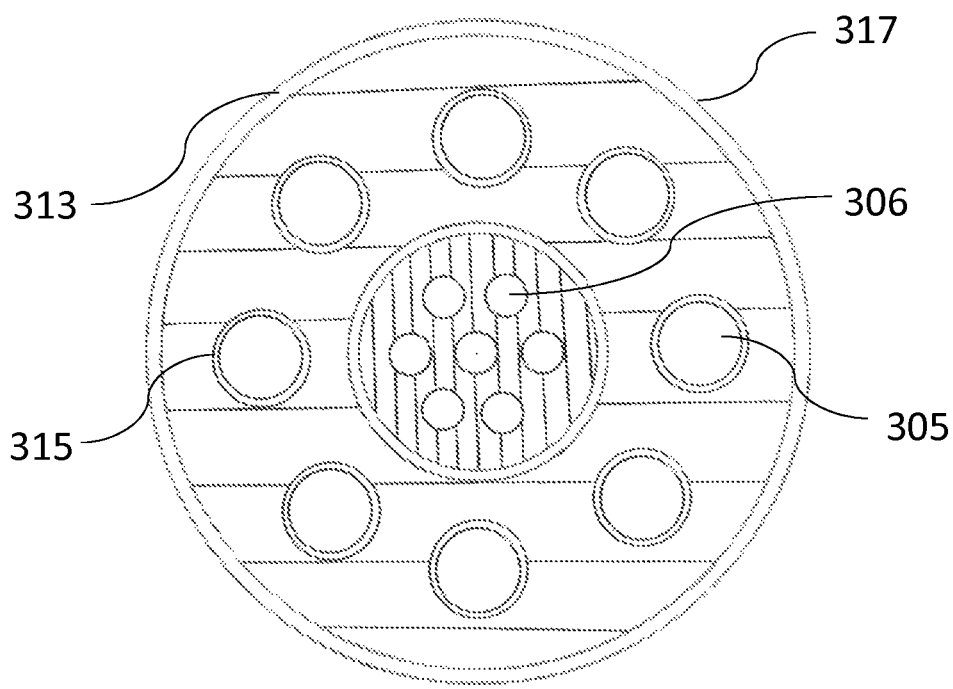
FIG. 4 shows another yet cross-section view of an MCS conduit design.

A further embodiment of the MCS cross-section design for oil wells during the initial natural flowing stage is shown in FIG. 4. This design is intended for use in higher-pressure wells. Inner small-diameter passageways (306) may be sheathed or encased (not shown), and such tubular sheath may be made using any of the materials described herein for such sheathing or encasing function. Also, larger-diameter outer passageways (305) may be individually sheathed or encased by a layer (315). Such sheathing or encasing layer (315), as well as encasing outer layer (313) of MCS conduit (317), may be made using any of the materials described herein for such sheathing or encasing function. Outer larger-diameter passageways (305), as well as inner smaller-diameter passageways (306), may further be arranged in a spiral pattern along the length of the MCS conduit (317) in efforts to make the MCS conduit (317) more amenable to spooling without the binding or creeping of such outer passageways (305) within MCS conduit (317).

Figure 5A:
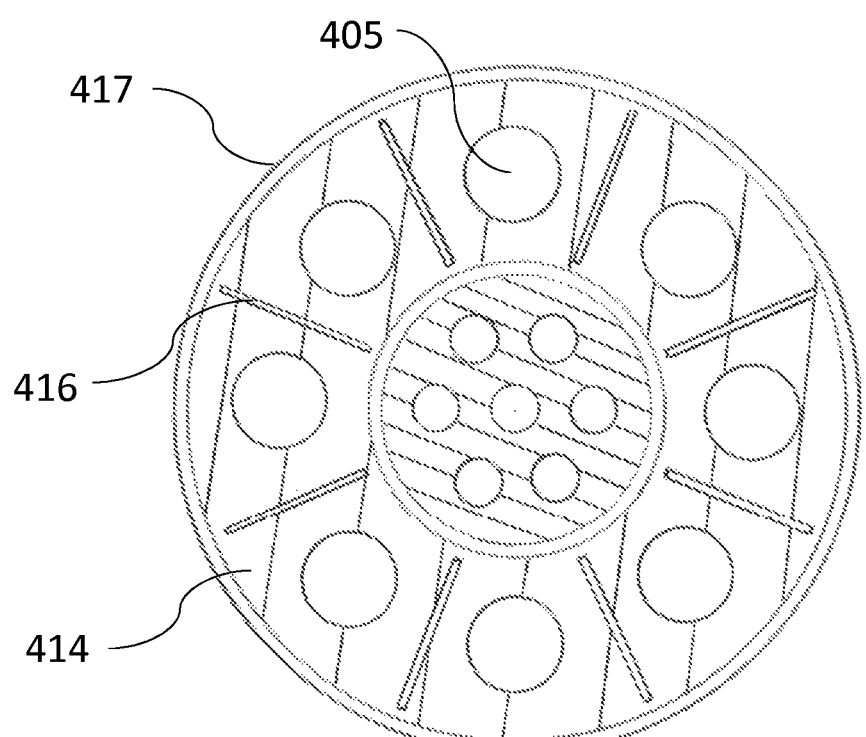
FIG. 5A shows a further alternate cross-section view of an MCS conduit design.

Further yet embodiments of the MCS cross-section design for higher-pressure oil wells feature protective partition elements (416) positioned between internal passageways (405)—see FIG. 5A. Such protective partition elements (416) may be made of a material with high strength or high ability to resist potential pressure differentials between neighboring passageways (405). Partition elements (416) may improve the ability of the MCS to resist internal collapse when one or more of the internal passageways (405) are further pressurized as a result of their respective stopping valves (104) being turned from open to closed position.

In efforts to increase the integrity of the outer-ring extrusion (414), such protective partition elements (416) may be made of a mesh (e.g., woven wire mesh, woven fiberglass mesh or mesh woven from carbon fibers). When extruding the outer ring extrusion (414), the extruding material may be embedded in the woven mesh partition elements. This approach may make such outer ring extrusion (414) behave more like a unified extrusion within itself vs. being partitioned inside by a solid partition structure such as plastic or metal strips. Using mesh to make partition elements (416) may also likely be more flexible than using solid material such as plastic or metal, improving the capability of MCS conduit (417) to be spooled on a reel. Using a mesh to make partition elements (416) may further likely make it easier to use in the extrusion process by the extruder—by providing better feeding characteristics given that it is more flexible compared to a solid strip material. In addition, the partition elements (416) may be made of high tensile strength material to increase the tensile strength of MCS conduit (417). Given that using mesh material will increase the integrity of the bond between either side of the partitioned elements within the outer extrusion ring (414), the partition elements may better grip the extruded material comprising the outer extrusion ring (414), resulting in a more unified structure with a better tensile strength as a whole.

While the explanation of the benefits of the MCS conduit (417) together with the MCS manifold (103) are made specifically to improving the production performance during the initial fountain stage of oil wells, it is also preferable to use this approach as opposed to a conventional single passageway tubing during artificial gas lift operations after the initial fountain stage is passed.

Figure 5B:
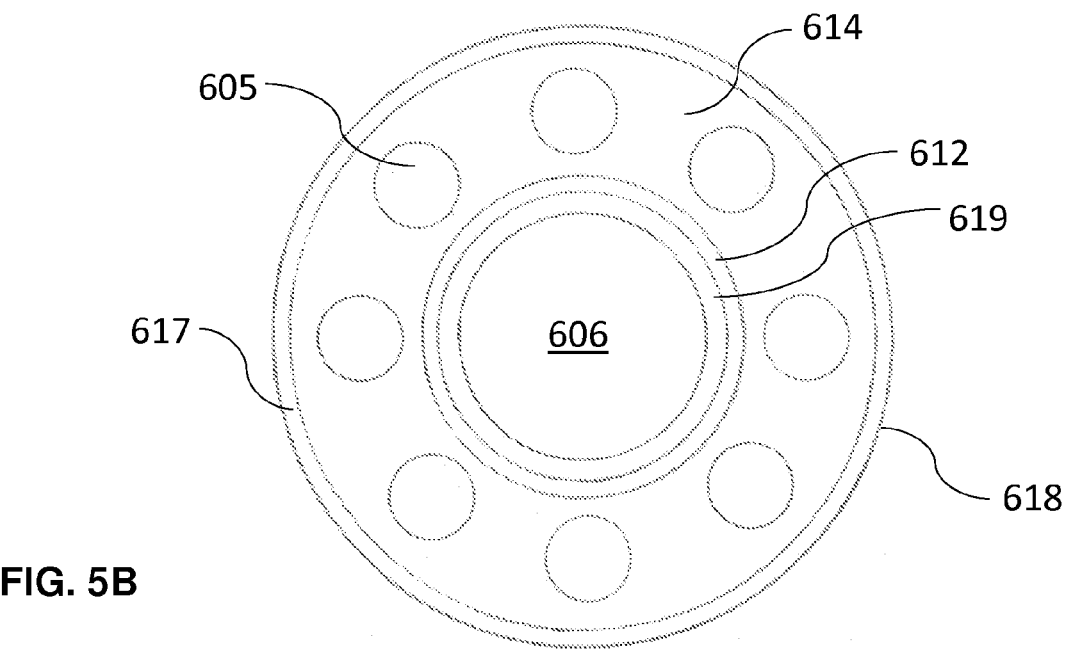
FIG. 5B illustrates yet another alternate cross-section view of the MCS conduit design.

Yet another design of the passageways of an MCS conduit is depicted in FIG. 5B. In a high-pressure, high-volume petroleum well, where the ability for a well to kick-off by itself is less important, the smaller 7 mm diameter passageways may be substituted with a single large-diameter passageway (606) (for example, 1½- to 3-inches in diameter), and the outer smaller-diameter passageways (605) may be increased in diameter to one inch or more. Especially in high-pressure wells, there may be a concern regarding pressure differentials in adjacent passageways causing rupture therebetween. In such higher-diameter MCS conduits, the ability to easily spool the conduit becomes a greater concern. Also, sheathing material (e.g. fiberglass weave as described for example in the '992 patent) that is resistant to burst is more-easily spooled than material that is resistant to being crushed (e.g., metal or plastic tubes), so designing an MCS passageway conduit that is dependent on resisting burst may provide more desirable spooling capability of the MCS conduit.

FIG. 5B depicts a large-diameter passageway (606) in the center of the MCS conduit (618), which is surrounded by an annular-shaped extrusion having smaller-diameter passageways (605). The large-diameter passageway (606) may be designed for example as described in the '992 patent. It may be formed by a lower-strength inner polymer liner (619) suitable for having contact with the production fluid, and having an outer woven layer (612) with high burst strength. Outer extrusion annulus-shaped layer (614) may include a plurality of passageways (605) each having a diameter smaller than the central passageway (606), all preferably wrapped in a sheathing material (617) (e.g., such as that described in the '992 patent). Optionally, one or more smaller-diameter passageways (605) may themselves be MCS extrusions with a plurality of their respective internal passageways having diameters small enough (e.g., 7 mm) to kick-off the well as explained in the pilot well installation described above (see FIG. 1).

In the circumstance where fluid is flowing up the MCS conduit at a steady-state rate, there is no significant accumulation of liquid at the bottom of the MCS conduit. In this case, the pressure at the top of the MCS passageways varies for different diameter passageways and depending on whether individual passageways are blocked. For example, the pressure near the top of a flowing small-diameter passageway (605) is lower than the pressure near the top of the flowing central large-diameter passageway (606), given that fluid flow resistance increases as diameter is reduced. Also, pressure at the top of a passageway that is stopped from flowing by the manifold stopping valve will approximate the pressure at the entrance to the MCS conduit, the highest of pressures in any of the passageways.

Implementing MCS design as in FIG. 5B in a new well may start with all passageways open for flow, with highest pressure at the top of the large-diameter central passageway (606), contained by the high-burst strength sheathing material (612). When the large-diameter central passageway (606) is shut off by using the stopping valve of the manifold at some point during the life of the well, the pressure increases further at the top of central passageway (606) and is contained by its sheathing (612). Therefore, the lower burst- and crush-strength material of annular extrusion (614) is sandwiched between the highest pressure region (casing pressure, i.e. external to outer layer 617) and the next-highest region (the large-diameter central passageway (606)), resulting in a highly stable design. Such design may be characterized by minimizing crush strength requirements and by utilizing high burst strength materials to effectively contain pressure differentials within and without the MCS at the top of the MCS conduit passageways. This in turn may lead to a more-easily spooled MCS conduit, especially for the larger-diameter, higher-pressure, higher-volume petroleum wells.

MCS extrusion cross-sectional shape may be other than round. A rectangular extrusion is described in U.S. Patent Publication No. US20130146171 entitled "Multi-tube Spoolable Assembly", as well being described in U.S. Pat. No. 8,459,965 B2 entitled Production Tubing Member With Auxiliary Conduit, that are together incorporated herein in their entirety by reference. These patents feature a rectangular shaped perimeter of their extrusion with rounded edges that may be beneficial in certain well conditions, especially high-pressure wells where the extrusion can be injected (snubbed) down into the wellhead while maintaining high wellhead pressure in the casing annulus. Such rectangular shape is beneficial in maintaining the moving seal between the extrusion and the wellhead equipment, while still being a spoolable production string. Also, a rectangular shape may more efficiently utilize the available space on the spool for flow passageways (higher cross-sectional density of flow area on the spool) vs. round.

In the U.S. Pat. No. 8,459,965, at least some or all tubes (34) and (32) may house MCS extrusions all with upward multi-phase flow, or alternately, tube(s) (34) may house MCS extrusions for upward multi-phase flow while high-pressure gas from the surface may be provided through internal tube (32), all controlled at the wellhead by the MCS manifold as per the present invention.

Alternatively, in U.S. Patent Publication No. US20130146171, as described in the example provided in paragraph [0031], four tubes of 4½ inch diameter would have a flow capacity similar to an 8-inch tube. Having the capability provided by the present invention to independently shut off the individual 4½ inch tubes using a manifold would permit extending the natural flowing phase of a well, and in a gas well extend the period of natural steady-state flow up the well before alternative artificial lift is necessary.

Also, one or more of the four tubes may be used to deliver high-pressure gas and/or for injecting well production chemicals.

Figure 6:
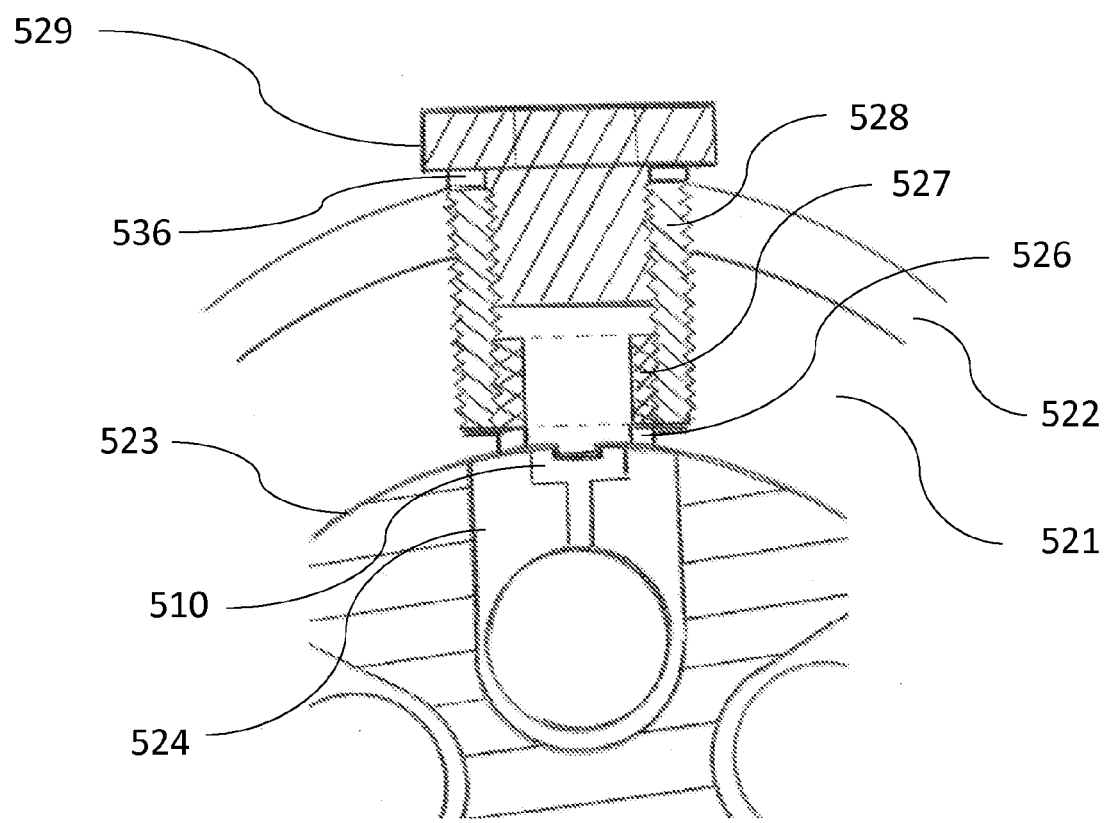
FIG. 6 shows a partial cross-section top view of a casing insert to facilitate operating a stopping valve of the present invention.

Manifold (523) of the present invention may be positioned at the wellhead above the hanger assembly that suspends the MCS extrusion in a well. For safety reasons, as well as to provide for fluid production through the annulus region (521) between the MCS extrusion (101) and the well outer casing (522), the manifold may be encased in conventional steel tubing or other material having a cross sectional dimension or diameter larger than the manifold. FIG. 6 is a partial top view of the cross section of manifold (523) together with outer casing (522).

To operate a stopping valve (524) of the manifold (523), access must be provided through the casing to engage an actuator (510) of such stopping valve. Also, in an operating well, it is likely that the annulus region (521) may have a pressure higher than atmospheric pressure of the outer environment. For safety reasons, as well as to contain reservoir fluids, FIG. 6 depicts a novel device configured to allow access to the actuator (510) of the stopping valve (524) while preventing reservoir fluids from escaping into the environment. An outer insert (528) having the shape of a short tube may have threads on both its inside and outside diameter surface. The outer threads of outer insert (528) may be threaded into the casing (522) to form a tight seal, and may include a bonding or sealing material therebetween. The inner insert (527) may be provided in the shape of a short tube and may have threads on its outer surface. It also may be equipped with a ring gasket (526) at its inner end facing the manifold (523)—in order to provide a seal with the outer surface of such manifold. Inner insert (527) may further have slots (not shown) on its outer end to engage with a screw driver or other such tool for purposes of threading thereof into the inside surface of the outer insert (528) in order to engage the ring gasket (526) with the outer surface of manifold (523) and create a tight seal therebetween. When access to the actuator (510) is not required, a bolt (529) having ring gasket (536) may be tightly screwed into the inside threads of outer insert (528) to provide a secondary seal between the pressurized annulus region (521) and the outside environment.

Figure 7A:
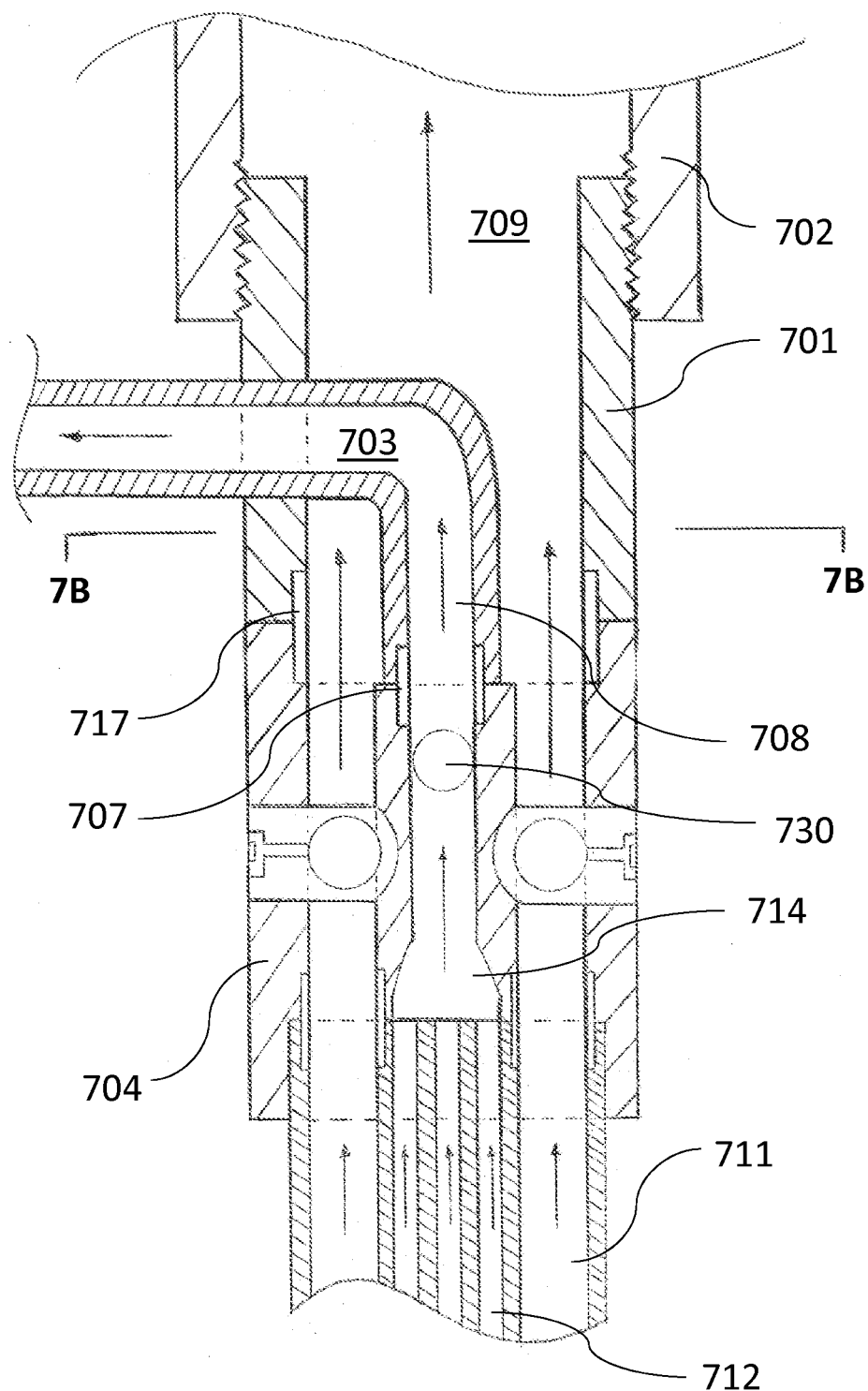
FIG. 7A shows a cross-section longitudinal view of another design of the MCS conduit.
Figure 7B:
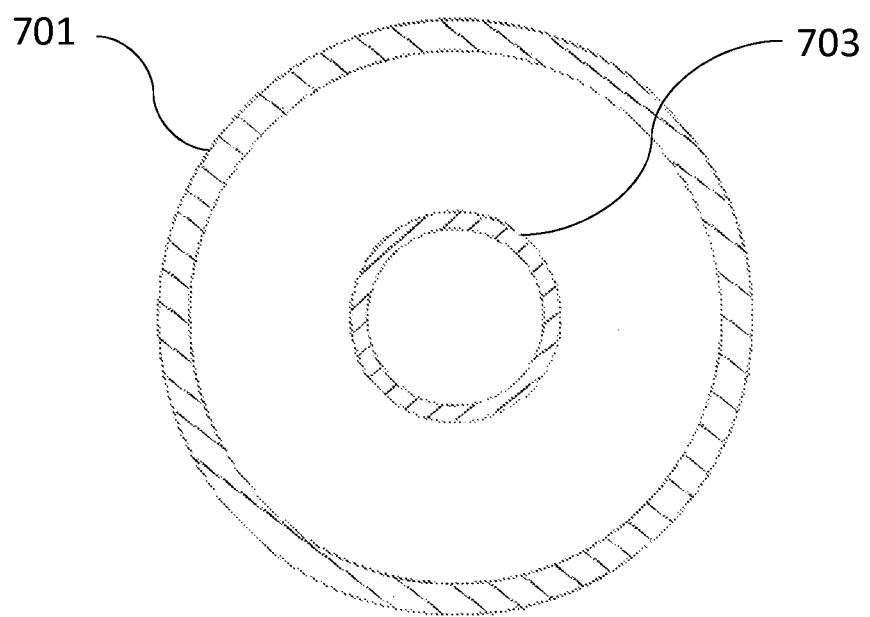
FIG. 7B shows a cross-sectional view of the same along lines 7B-7B shown in FIG. 7A.

In yet another embodiment of an MCS conduit as shown in FIG. 7A and FIG. 7B, instead of all flow through MCS passageways (711) and (712) exiting from manifold (704) into one consolidating conduit (102 in FIG. 2), there are two or more consolidating exit conduits such as (703) and (709). Pluralities of similar diameter passageways have similar flow characteristics, and managing their flow as separate groups may have a number of advantages.

First, this capability to segregate exit flows will simplify kick-off operations. During kick-off, all large-diameter MCS passageways (711) should be closed initially, so that all flow is through the plurality of small-diameter passageways (712). Once all liquid has been evacuated from the wellbore, the desired number of stopping valves controlling flow through the large-diameter MCS passageways (711) are opened. By having one exit for the flow (709) through all of the large-diameter MCS passageways (711), one downstream valve in conduit (702) can stop flow through all large-diameter MCS passageways (711), simplifying stopping valve operations during kick-off and, given less utilization, extending the life and reliability of the stopping valves housed in manifold (704).

In addition, this capability to segregate exit flows from MCS manifold (704) may permit separate control of exit pressure of the small-diameter passageways at (708) vs. that of the large-diameter passageways at (709). The small-diameter passageways may be better at producing liquid given their lower gas slippage rate, and they may be better capable of taking advantage of high-pressure gradients to increase the lifting power in the column. The pressure ratio (well bottom pressure divided by wellhead pressure) in a typical steady-state flowing gas well is often as low as 1.1×. While flowing through smaller diameter tubes increases flow resistance, small-diameters are also associated with a much higher rate of transfer of energy from the carrier phase (gas) to the carried phase (liquid) during multi-phase flow conditions. The pressure ratio in the MCS pilot gas well installation cited above was approximately 3.2×, and resulted in a lower gas-liquid ratio. It is proposed to preferentially produce most gas through the large-diameter passageways (711) and to preferentially produce most liquid through the small-diameter passageways (712), assisted by lowering the exit pressure at (708).

Then at the surface, optionally after the liquid has been separated out, a compressor may be used to increase the gas pressure to that of the main flow (709) and be re-connected thereto, thereby minimizing the volume of gas (vs. gas-lift operations through a single large-diameter tube) that must be compressed given the efficiency of an MCS having small-diameter passageways.

Alternatively, gas flowing through exit conduit (703) may be re-combined with the main flow (709) downstream of the surface choke that controls the volume of flow through conduit (702) and reduces the line pressure. The equivalent of the pressure differential across the choke may now be added to the pressure gradient in the small-diameter MCS passageways (712), increasing the power of the MCS to lift liquid, thereby reducing or eliminating the need for a compressor.

In embodiments, using more than one exit flow from MCS manifold (704) allows butterfly stopping valve (730) to be replaced by a stopping valve downstream in conduit (703), where such stopping valve function would be easier to implement, having better access for control and repair, permitting a greater variety of suitable valve designs and simplifying the design of MCS manifold (704).

As indicated in FIG. 7A, flow through small-diameter passageways (712) may be consolidated in MCS manifold conduit (714) and flows on to exit in passageway (708) through conduit (703). Flow through large-diameter MCS passageways (711) may be individually directed through MCS manifold (704) and may be consolidated in flow stream (709) and on to flow out through conduit (702). Sealing ring (707) seals the flow from the consolidating conduit (714) into exit conduit (703), and may be threaded, bonded or the like. Sealing ring (717) seals the flow from the MCS manifold (704) to intermediate conduit (701), and may be threaded, bonded or the like. FIG. 7B is a cross-sectional view of intermediate conduit (701) at 7B-7B.

In yet further contemplated embodiments of the invention elements of the design depicted in FIG. 5B may be combined with elements of the design depicted in FIG. 7A. This design may also incorporate within manifold (704) the capability to direct flow in a downward direction toward the well bottom through one or more passageways (606), (605), (703), (711), (712) or (709). Such passageways may be used to carry compressed gas to the entrance to the MCS extrusion to assist in kicking off the well or to increase liquid production. These passageways may also be used to deliver well fluid treatment chemicals in a concentrated form through the MCS extrusion passageways (711) and (712). Passageways (711) and (712) may further be used to house wires or fiber optic cables to communicate with or provide power to downhole equipment, or to transfer hydraulic fluid.

It is contemplated that any embodiment discussed in this specification can be implemented with respect to any method of the invention, and vice versa. It will be also understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12, 15, 20 or 25%.

All of the devices and/or methods disclosed and claimed herein can be made and executed without undue experimentation in light of the present disclosure. While the devices and methods of this invention have been described in terms of preferred embodiments, it will be apparent to those of skill in the art that variations may be applied to the devices and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

We claim:

1. A device for controlling flow in a multi-channel system deployed in a petroleum well, said multi-channel system comprising a plurality of parallel passageways configured for transporting individual multi-phase fluid flows within said petroleum well, said device comprising a manifold with a plurality of inlets operably connected with all of said parallel passageways, each inlet is equipped with a stopping valve configured to open or close flow of said multi-phase fluid therethrough, said manifold is further equipped with a first outlet configured to transport a combined flow of said multi-phase fluid after exiting from said stopping valves, whereby individual opening or closing of one or more of said stopping valves causing a corresponding change of a total cross-section area available for producing said multi-phase fluid from said petroleum well.

2. The device as in claim 1, wherein said plurality of passageways comprise passageways of the same size.

3. The device as in claim 1, wherein said plurality of passageways comprise passageways of various sizes.

4. The device as in claim 3, wherein said manifold comprises individual stopping valves of various sizes corresponding to the size of their respective passageways.

5. The device as in claim 1, wherein said plurality of passageways comprise a first plurality of passageways and a second plurality of passageways, said first plurality of passageways are sized to be smaller than said second plurality of passageways.

6. The device as in claim 1, wherein said first plurality of passageways is configured to consolidate flow in said first outlet after passing through said manifold, said second plurality of passageways is configured to consolidate flow in a second outlet after passing through said manifold.

7. The device as in claim 1, wherein a total number of parallel passageways is the same or greater than a total number of inlets of said manifold.

8. The device as in claim 7, wherein if the total number of said passageways exceeds the total number of inlets of said manifold, said manifold further comprises a lower end configured to consolidate flow through at least some of said passageways together so as to match the total number of inlets of said manifold.

9. The device as in claim 1, wherein at least one of said stopping valves is operable to be open, closed or partially closed.

10. The device as in claim 1, wherein at least one of said stopping valve is motorized and configured to be communicated with by wire or wirelessly, and controlled by an external switching mechanism operated manually or by a computerized controller.

11. The device as in claim 10, wherein said computerized controller is provided with an input from a sensor, said sensor is configured to detect either one of an intermittent flow, a steady-state flow or a flow velocity in said multi-channel system.

12. A method to control multi-phase fluid flow directed to pass through a multi-channel system deployed in a single petroleum well, said method comprising the steps of:
  a. providing a manifold with a plurality of inlets in fluid communication with passageways of said multi-channel system,
  b. individually opening or closing said inlets so as to permit or not said multi-phase fluid to flow through said respective passageways of the multi-channel system, and
  c. consolidating all flow after exiting from said opened inlets towards an outlet of said petroleum well, whereby opening or closing of one or more of said inlets causing a corresponding change of a total cross-sectional area available for producing flow from said single petroleum well.

13. The method as in claim 12, wherein in step (b) said inlets are all initially opened, said step (b) further including selectively closing said inlets one or more at a time throughout the life of said petroleum well so as to maintain steady flow of said multi-phase fluid therefrom.

14. The method as in claim 12, wherein in step (b) one or more of said inlets are closed upon detection of liquid column presence in said petroleum well.

15. The method as in claim 12, wherein said multi-channel system comprises a first plurality of passageways and a second plurality of passageways, said first plurality of passageways are sized to be smaller than said second plurality of passageways, said step (b) comprising opening one or more of said first plurality of passageways to kick off said well and remove accumulated liquid therefrom, said step (b) further comprising opening or closing one or more of said second plurality of passageways using said manifold to permit higher fluid volume production once the accumulated liquid is removed from the well.

16. The method as in claim 15, wherein in said step (b) after initial opening said second plurality of passageways are closed sequentially as wellbore pressure declines with well depletion.

* * * * *